Patented June 3, 1947

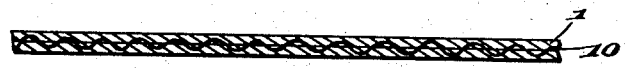
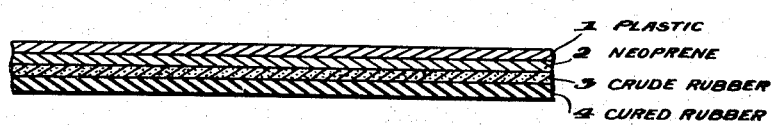
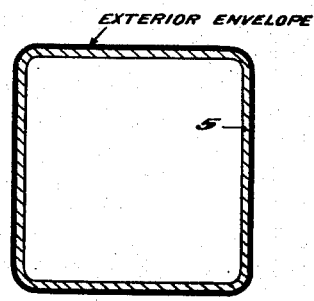
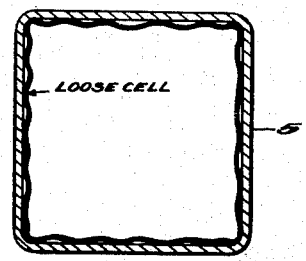
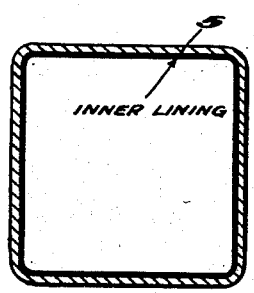

2,421,613

UNITED STATES PATENT OFFICE 2,421,613

PLASTIC LINER FOR CONTAINERS

Reid Berry Gray, Dundalk, and Joseph C. De Weese, Essex, Md., assignors to The Glenn L. Martin Company, Baltimore, Md.

Application December 15, 1941, Serial No. 423,108

4 Claims. (Cl. 154—43.5)

This invention relates to tanks, cells or other carrying or retaining structures such as hose and pipe for use in storage or delivery of hydrocarbon fuels, blended fuels, gases, vapors, hydraulic operating liquids and the like for aircraft, boats and motor vehicles.

The present invention particularly pertains to the forming of flexible walled tanks and cells for this purpose wherein the liquid bearer is coated or lined with a solid, flexible, plastic surface having low extractive and permeability properties. The term "solid, flexible, plastic" is intended to include materials such as nylon, which is a solid synthetic linear condensation polymer now being manufactured and sold by the Dupont Company. Other examples of the type of plastics included in this invention are "Butacite," which is a polyvinyl butyral manufactured and sold by the Dupont Company; "Pliofilm," which is a rubber hydrochloride now being manufactured and sold by the Goodyear Tire & Rubber Company; "Saflex," being manufactured and sold at the present time by the Monsanto Chemical Company and understood to be polyvinyl butyral; and the co-polymer of vinyl acetate and vinyl chloride, which is available on the open market.

This invention relates to all types of fluid containers, particularly those for holding liquids that are predominately hydrocarbons, and the use of the invention includes both storage tanks or cells and self-sealing linings or coverings which will autogenously seal themselves or materially restrict the loss of liquid when punctured or ruptured.

In the accompanying drawings, there are shown several examples of the wall structure of the tank or cell and the manner in which the invention can be embodied in fuel or other tanks.

Fig. 1 is a fragmentary cross section of an inner lining comprising a fabric impregnated, calendered or coated with a plastic material, as heretofore defined.

Fig. 2 is a fragmentary cross section of a lining in which a loose or adhering sheet of plastic material, as heretofore defined, is used with a backing sheet of wear resistant fabric or other material.

Fig. 3 is a fragmentary cross section of a lining for a self-sealing tank or cell, comprising a plurality of layers or material with the inner layer composed of a plastic material, as heretofore defined.

Fig. 4 is a cross sectional view through a rigid tank enveloped in an outer covering of self-sealing construction, as shown in Fig. 3.

Fig. 5 is a cross sectional view of a tank or frame which is lined with a flexible walled interior compartment constructed in accordance with the disclosure in Figs. 1, 2 or 3.

Fig. 6 is a cross sectional view of a tank having a lining of plastic per se or a lining of the type disclosed in Fig. 1.

Heretofore, it has been proposed to wrap or cover the fuel tanks, hydraulic fluid reservoirs, engine oil storage containers, gas holders of the type used in aircraft, armored tanks, combat cars, boats and other military vehicles with a material which will afford some protection against puncture by gun fire such as machine gun or projectiles normally classified as small cannon or fragmentation. To date, these proposals have not proved particularly satisfactory as the fuel or other liquid attacks the coverings when the rigid tank walls are punctured.

Modern practice indicates that it is preferable to provide a bladder-type container within the supporting therefor, as disclosed and claimed in our co-pending application, Serial No. 338,052, filed May 31, 1940, and entitled "Fluid tank." This prior application is directed to a supporting outer structure and a flexible inner liner commonly referred to as a cell, made up of a plurality of layers, the inner layer or surface upon which the fluid contacts being composed of a fabric impregnated with hydrocarbon resistant neoprene. Cemented or otherwise joined to the neoprene impregnated fabric is a layer of sheet neoprene backed up with a layer of crude, unvulcanized rubber and an outer layer of soft, vulcanized rubber. The inner cell is preferably constructed so that its outer dimensions are essentially larger than the inner dimensions of the outer supporting structure or frame, as described and claimed in Patent No. 2,102,950, issued December 21, 1937, to R. B. Gray and E. L. Zivi.

The present improvement is an improvement over our prior invention, described and claimed in our application Serial No. 338,052. In the present improvement, the inner layer or surface contacting the fluid in the tank or cell is composed of a plastic material such as nylon, Butacite, Pliofilm, Saflex, the co-polymer of vinyl acetate and vinyl chloride or similar materials. These materials, particularly nylon, are of considerable advantage as they have very low permeability, are not deteriorated within a reasonable service life by the contained fluids, and possess high cold cracking resistance suitable for the service intended. Of added advantage is the use of such linings when high octane gasoline or fuels fortified with aromatic hydrocarbons such as toluene, benzene and xylene are stored in the containers.

Where it is desired to protect the tanks or cells by rendering them self-sealing, a multiple layer construction is used, as shown in Fig. 3. Here the inner layer or surface 1, against which the fluid contacts, is composed of a flexible, plastic sheet of any of the materials described above, although, as before stated, nylon, which is a solid synthetic linear condensation polymer, has proved most successful. The synthetic linear condensation polymer preferred for the present purpose is that resulting from the condensation of a diprimary diamine and a dibasic carboxylic acid. Backing up the nylon or other plastic layer is a second layer 2 of soft neoprene, which is a synthetic rubber product well known in the trade and available in the open market. The succeeding layer 3 is composed of crude, unvulcanized rubber, while the outer layer 4 is preferably high strength, cured, vulcanized rubber. The several layers may be secured together in any approved manner as by heat sealing, cementing or the like.

As described in detail in our co-pending application, Serial No. 338,052, a projectile may puncture such a multiple lining, but only a small amount of fuel will leak through the opening created by the projectile by reason of the swelling and adhesion of the crude, unvulcanized rubber and soft, vulcanized rubber layers. This self-sealing structure may be used either as an interior bladder-type of cell, which is supported by the structure, or as a sealant blanket applied in intimate contact to the exterior of a conventional tank. This is diagrammatically shown in Figs. 5 and 4, respectively.

It is within the purview of this invention to coat the interior of a conventional metal tank with the plastic composition or apply a sheet of plastic of the character heretofore described thereto. The plastic lining may be applied in any suitable way, or as shown in Fig. 1, textile fabric 10, such as canvas, synthetic fiber, airplane cotton, nylon fabric or glass cloth, may be impregnated, calendered or coated with the plastic 1 and the entire inner walls of the tank 5 lined with this impregnated material, as disclosed in Fig. 6.

Where flexible walled storage cells or containers are employed, the inner flexible, plastic lining 1 may be loosely attached or secured to a wear resisting backing material, as diagrammatically illustrated in Fig. 2.

Fig. 5 of the drawings is intended to diagrammatically illustrate an interior cell or lining of larger dimensions than the outside frame or tank 5 and composed of material constructed in accordance with the structures shown in Figs. 1, 2 or 3.

The word "plastic," as used in describing this invention, is defined as:

1. A synthetic and/or a natural material.
2. Its chief distinguishing component is a resin or other organic binder.
3. At some intermediate stage in its production, it must be formable.
4. At a subsequent stage, it must be brought to an approximation of predetermined pliability or rigidity.

We claim:

1. A hydrocarbon fluid container having an outer supporting and retaining structure, a flexible lining cell comprising a plurality of layers secured together positioned within the structure to contain said liquid but transmit the pressure load of said liquid to the retaining structure, said cell having an inner lining in contact with said liquid, consisting of a low permeability, synthetic linear condensation polymer preferably formed by the condensation of a diprimary diamine and a dibasic carboxylic acid.

2. A hydrocarbon fluid container having an outer supporting and retaining structure, a flexible lining cell comprising a plurality of layers secured together positioned within said retaining structure, the outside dimensions of which cell are substantially equal to the inside dimensions of the retaining structure, said cell having an inner coating in contact with said liquid consisting of a low permeability synthetic linear condensation polymer preferably formed by the condensation of a diprimary diamine and a dibasic carboxylic acid.

3. A self-sealing cell for retaining fluids that are predominately hydrocarbons, consisting of a flexible, multi-walled container for said fluids, said container comprising a plurality of layers secured together, the inner layer of which is composed of a low permeability, synthetic linear condensation polymer formed by the condensation of a diprimary diamine and a dibasic carboxylic acid, and one of the intermediate layers composed of a material which swells upon contact with hydrocarbon fluids.

4. A hydrocarbon liquid container having a flexible wall structure comprising a plurality of layers of plastic material secured together, the inner layer of which next to the liquid is composed of a synthetic linear polyamide and one of the intermediate layers being composed of crude unvulcanized rubber.

REID BERRY GRAY.
JOSEPH C. DE WEESE.

REFERENCES CITED

The following references are of record in the file of this patent:

UNITED STATES PATENTS

| Number | Name | Date |
| --- | --- | --- |
| 2,252,554 | Carothers | Aug. 12, 1941 |
| 1,779,397 | Kraft | Oct. 21, 1930 |
| 1,297,305 | Thacher | Mar. 11, 1919 |
| 2,188,332 | Carothers | Jan. 30, 1940 |

FOREIGN PATENTS

| Number | Country | Date |
| --- | --- | --- |
| 301,089 | Great Britain | Sept. 26, 1929 |
| 189,848 | Great Britain | Nov. 30, 1922 |
| 538,873 | Great Britain | Dec. 23, 1940 |